(12) United States Patent
Echeverria Dura et al.

(10) Patent No.: US 11,767,818 B2
(45) Date of Patent: Sep. 26, 2023

(54) WIND TURBINE BLADE

(71) Applicant: NORDEX ENERGY SPAIN, S.A.U., Barasoain (ES)

(72) Inventors: Fernando Echeverria Dura, Barasoain (ES); Unai San Miguel Alzorriz, Barasoain (ES); Elena Llorente Trujillo, Barasoain (ES); Alvaro Gorostidi Martinez De Lecea, Barasoain (ES); Teresa Arlaban Gabeiras, Barasoain (ES); Jose Miguel Garcia Sayes, Barasoain (ES); Miguel Nunez Polo, Barasoain (ES)

(73) Assignee: NORDEX ENERGY SPAIN S.A.U., Barasoain (ES)

( * ) Notice: Subject to any disclaimer, the term of this patent is extended or adjusted under 35 U.S.C. 154(b) by 0 days.

(21) Appl. No.: 17/148,052

(22) Filed: Jan. 13, 2021

(65) Prior Publication Data

US 2021/0231096 A1 Jul. 29, 2021

(30) Foreign Application Priority Data

Jan. 16, 2020 (EP) .................................... 20382023

(51) Int. Cl.
*F03D 1/06* (2006.01)
(52) U.S. Cl.
CPC ...... *F03D 1/0633* (2013.01); *F05B 2240/221* (2013.01); *F05B 2250/71* (2013.01)
(58) Field of Classification Search
CPC .................................................. F03D 1/0633
See application file for complete search history.

(56) References Cited

U.S. PATENT DOCUMENTS

| 4,976,587 | A | 12/1990 | Johnston |
| 5,474,425 | A | 12/1995 | Lawlor |
| 8,241,000 | B2 * | 8/2012 | Blanton ............... F03D 1/0641 416/223 R |
| 9,611,833 | B2 * | 4/2017 | Madsen ............... F03D 1/0641 |
| 10,495,056 | B2 * | 12/2019 | Zamora Rodriguez ...................... F03D 1/0633 |
| 2009/0274559 | A1 | 11/2009 | Petsche et al. |
| 2015/0361952 | A1 | 12/2015 | Petsche et al. |
| 2016/0177922 | A1 | 6/2016 | Zamora Rodriguez et al. |

FOREIGN PATENT DOCUMENTS

WO 2013092852 A1 6/2013

* cited by examiner

*Primary Examiner* — Courtney D Heinle
*Assistant Examiner* — John S Hunter, Jr.
(74) *Attorney, Agent, or Firm* — Hayes Soloway PC

(57) ABSTRACT

A blade for a rotor of a wind turbine having a longitudinal direction with a tip end and a root end and a transverse direction, comprising: a profiled contour that when impacted by an incident airflow, generates a lift, wherein the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction to the lift-generating profile of the airfoil region, and further comprising a shoulder, wherein the shoulder is located in the airfoil region, thus yielding a slender and relative thick blade maximizing energy output, reducing bearing loads and facilitating transportation.

19 Claims, 3 Drawing Sheets

WIND TURBINE BLADE

CROSS-REFERENCE TO RELATED APPLICATIONS AND PRIORITY

This patent application claims priority from European Patent Application No. 20382023.8 filed Jan. 16, 2021. This patent application is herein incorporated by reference in its entirety.

OBJECT OF THE INVENTION

The present invention relates to a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising: a profiled contour including a pressure side and a suction side, as well as a leading edge and a trailing edge with a chord having a chord length extending there between, the profiled contour, when being impacted by an incident airflow, generating a lift, wherein the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region, and a shoulder, wherein the shoulder is located in the airfoil region, yielding a slender and relative thick blade maximizing energy output, reducing bearing loads and facilitating transportation.

BACKGROUND OF THE INVENTION

Wind turbine manufacturers are constantly making efforts to improve the efficiency of their wind turbines in order to maximize the annual energy production. One of the key design aspects affecting the efficiency and the annual energy production (AEP) is aerodynamic blade design, i.e. the selection of the proper profiles and airfoils and its dimensions and the distribution of the profiles along the length of the blade. However, one cannot arbitrarily select the airfoils for maximizing AEP without taking into account how the design also affects the loads transmitted to the rest of the wind turbine components. Furthermore, the profiles and its dimensions need to be selected so as to ensure enough available space for the internal structural components and to prevent any transport restrictions.

DESCRIPTION OF THE INVENTION

A new wind turbine blade is disclosed herein with which it has been found that at least the above disadvantages relating to the prior art solutions are mitigated.

More in particular, according to a first aspect of the invention, a blade for a rotor of a wind turbine having a substantially horizontal rotor shaft is provided, said rotor comprising a hub, from which the blade having a longitudinal distance L extends substantially in a radial direction when mounted to the hub, the blade having a longitudinal direction r with a tip end and a root end and a transverse direction, wherein said blade comprises:

a profiled contour including a pressure side and a suction side, as well as a leading edge and a trailing edge with a chord having a chord length c extending there between, the profiled contour, when being impacted by an incident airflow, generating a lift, wherein the profiled contour is divided into:

a root region having a substantially circular or elliptical profile closest to the hub, an airfoil region having a lift-generating profile furthest away from the hub, and a transition region between the root region and the airfoil region, the transition region having a profile gradually changing in the radial direction from a circular or elliptical profile at the root region to the lift-generating profile of the airfoil region, a shoulder having a shoulder width W located at a first distance L1 from the blade root end, wherein the airfoil region extends from a second distance L2 from the blade root end, and the second distance L2 is smaller than the first distance L1 from the blade root end so that the shoulder is located within the airfoil region.

The shoulder is here defined as the position at which the wind turbine blade has its largest chord length. The length interval is defined from the root end to the tip end, the root end thus being positioned at r=0 and the tip end being positioned at r=L.

Thus, the aforementioned blade discloses an airfoil region which includes the position at which the wind turbine blade has its largest chord length (shoulder). Consequently, said blade provides an extended airfoil region from the shoulder towards the root maximizing energy production.

Preferably, the airfoil region extends from a second distance L2 from the blade root end to the blade tip end.

In another aspect, the relative thickness of the blade at the shoulder is between 30% and 40%, more advantageously between 32% and 36%.

In all, this design provides for a great power performance of the wind turbine while enable reducing the loads, as the blade in the shoulder region already comprises airfoils with a reduced relative thickness over what is known in the state of the art.

The relative thickness in a blade length interval of 0-0.8 L is at least 20%.

Thus, it is seen that the invention provides a relatively thick wind turbine blade in the airfoil region towards the tip while it provides a reduced relative thickness and a thick root diameter. Thereby, it is possible to minimize loading of the blade, since the total area of the blade is minimized, thus lowering for instance storm loads. Further, the relatively thick blade is stiffer, due to the load carrying structure being further spaced apart, which in turn means that the blade shell can be made thinner. The overall mass may thus be kept down. However, the combination of using a narrow shoulder width and a relatively thick blade profile has surprisingly been found to increase the annual energy production (AEP) of such a blade significantly, in particular since the blade can be made longer than existing blades imposing approximately the same loading on the wind turbine provided with such blades because of its slenderness and improving bearing loads for its relative high thickness.

The introduction of the shoulder inside the airfoil region have being found to increase energy production to a further extend.

In one embodiment, the shoulder is located in an interval between 0.18 L and 0.25 L from the blade root end, advantageously between 0.20 L and 0.22 L. In one advantageous embodiment, a wind turbine blade having a length in the interval of 70-80 meters has the shoulder located between 0.21 L and 0.22 L.

The airfoil region may extend from a distance that is less than 0.2 L from the blade root end.

Preferably, the blade comprises a first airfoil profile at the beginning of the airfoil region (in L1).

The first airfoil profile has a relative thickness of between 36% and 44% to enable a proper transition between the root section and the airfoil region. More preferably between 38% and 42%.

Wherein the distance from the shoulder to the beginning of the airfoil region is more than 0.02 L, i.e. the difference between L1 and L2 being greater than 0.02 L.

Advantageously, the blade comprises a second airfoil profile also located closer to the root end than the shoulder, i.e. L3<L1.

Wherein said second profile has a relative thickness of between 30% and 36%.

Moreover, the distance from the second airfoil profile to the shoulder is preferably more than 0.0035 L, i.e. the difference between L1 and L3 being greater than 0.0035 L.

In a preferred embodiment the second airfoil profile comprises a relative thickness between 34% and 36% and the difference between the first distance (L1) and the third distance (L3) is greater than 0.0035 L.

L1, L2 and L3 being distances taken from the blade root end.

In yet another advantageous embodiment, the relative blade thickness in the blade interval of 0-0.8 L is at least 25%, or at least 26%. More advantageously, the relative thickness in a blade length interval of 0-0.65 L is at least 28%.

In an embodiment of the invention, also the relative thickness in a blade length interval of 0.8 L-0.95 L is at least 20%.

In an embodiment of the invention, the relative thickness in a blade length interval of 0.8 L-0.98 L is at least 20%.

More advantageously, the relative thickness in a blade length interval of 0.8 L-0.9 L is at least 25%.

Advantageously, the blade length is at least 65 meters. More advantageously between 65 meters and 90 meters. The slenderness and thickness proposed have been found to be particularly suited for these blade lengths, providing a design with a compromised result between power production, wind turbine loads and blade deflection.

According to a second aspect, the invention provides a number of wind turbine blade profiles, which are particularly effective and which can be based on some well-known blade airfoil profiles in the industry, such as DU airfoil profiles.

Thus, the invention provides a wind turbine blade, which in a cross-section comprises at least one of the following six airfoil profiles:
- a first airfoil profile ($A_1$) having a relative thickness of between 38% and 42% located closer to the root than the shoulder. More in particular, the distance from the shoulder to the root is more than 0.18 L and less than 0.25 L.
- a second airfoil profile ($A_2$) having a relative thickness of between 34% and 36% located closer to the root than the shoulder, wherein the difference between the first distance (L1) and a third distance (L3) from the second airfoil profile to said shoulder is greater than 0.0035 L.
- a third airfoil profile ($A_3$) having a relative thickness of between 29% and 31% located closer to the tip than the shoulder.
- a fourth airfoil profile ($A_4$) having a relative thickness of between 24% and 26%, located at a blade span position between 0.75 L and 0.9 L
- a fifth airfoil profile ($A_5$) having a relative thickness of between 20.6% and 21.4% located at a blade span position between 0.94 L and 0.98 L
- a sixth airfoil profile ($A_6$) having a relative thickness of between 17.7% and 18.3% located at a blade span position between 0.96 L and 1.0 L.

Furthermore, in a preferred embodiment the wind turbine blade comprises one or more lift-generating profiles along a blade length interval of 0.85 L-0.95 L wherein the chord length of said lift-generating profiles is greater than 30% of the chord length at the shoulder.

Preferably, the blade further comprises one or more lift-generating profiles along a blade length interval of 0.95 L-0.975 L wherein the chord length of said lift-generating profiles is greater than 20% of the chord length at the shoulder.

This high chord length near the tip of the blade (along the blade length interval of 0.85 L-0.95 L) provides more available space for the internal structural 25 components. Particularly, the main spar cap reaches further span without the need of modifying the constant width along span. This feature is advantageous from a manufacturing point of view and provides a significant reduction of cost.

In addition, the aerodynamic performance near the tip of the blade is enhanced. This aspect is really relevant as this portion of the blade represents a significant contribution to the total aerodynamic torque relevant for the energy generation.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

A detailed explanation of an example of preferred embodiment of the object of the present invention is provided below, with the aid of the aforementioned figures.

Figure 1:
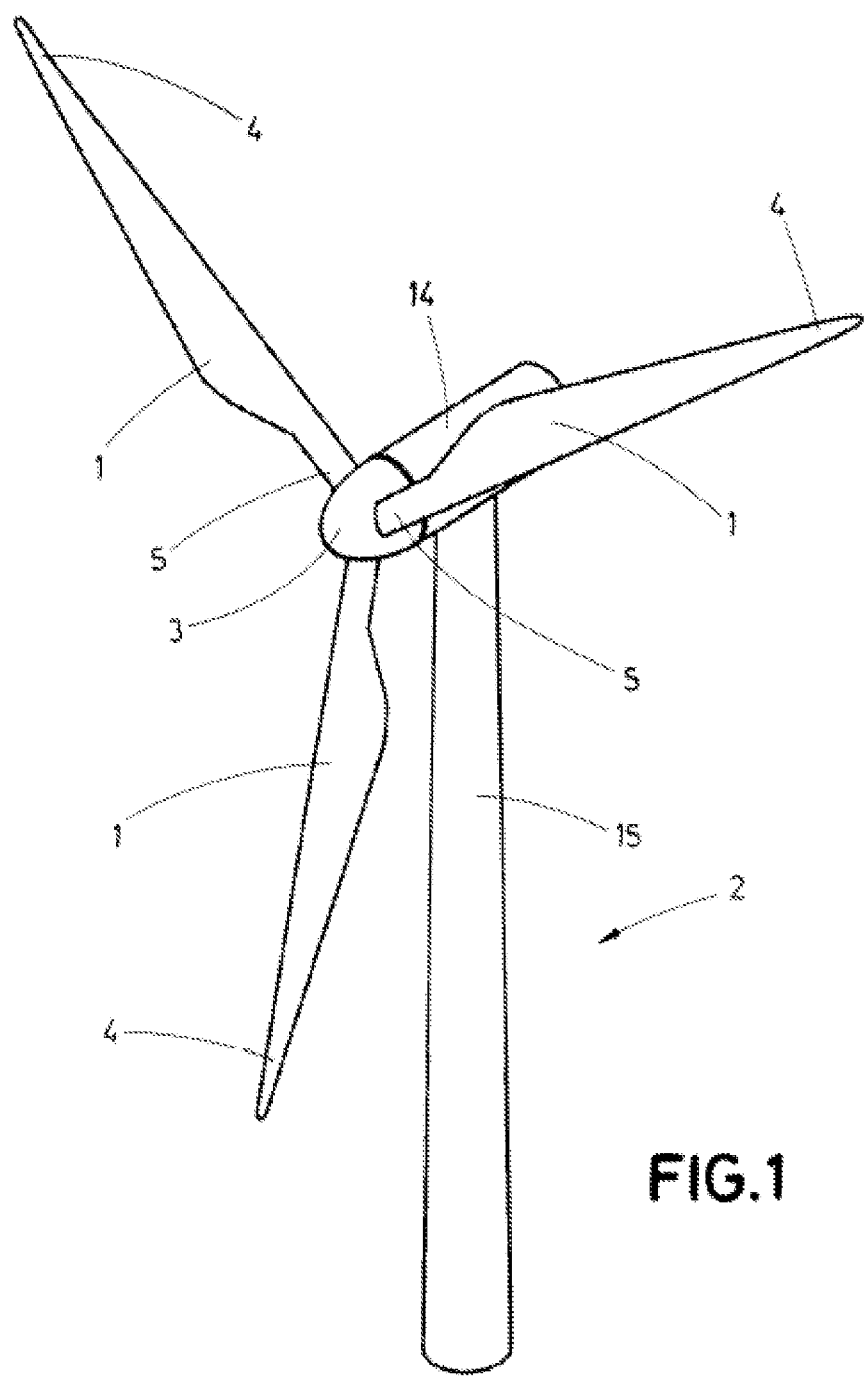
FIG. 1.—Shows a horizontal axis upwind wind turbine.

FIG. 1 illustrates a conventional modern upwind horizontal axis wind turbine (2) with a tower (15), a nacelle (14) and a rotor with a substantially horizontal rotor shaft. The rotor includes a hub (3) and three blades (1) extending radially from the hub (3), each having a blade root (5) nearest the hub and a blade tip (4) furthest from the hub (3). The rotor has a radius R comprising the longitudinal distance of each blade plus the hub radius.

Figure 2:
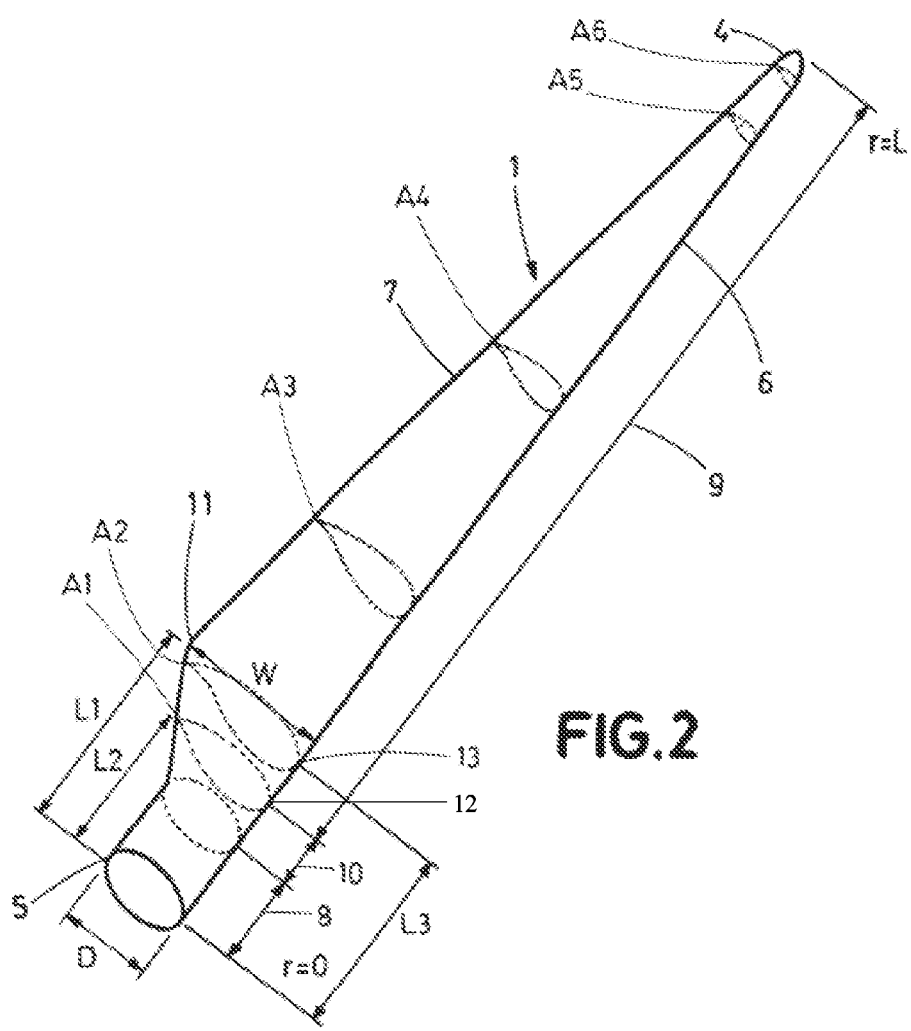
FIG. 2.—Shows a schematic view of a wind turbine according to a preferred embodiment of the invention, where it is shown the first airfoil profile and the second airfoil profile and the shoulder inside the airfoil region.

FIG. 2 illustrates a schematic view of a wind turbine blade (1) according to a preferred embodiment of the invention, where it is shown that the blade comprises a profiled contour including a pressure side and a suction side, as well as a leading edge (6) and a trailing edge (7) with a chord having a chord length (c) extending there between, the profiled contour, when being impacted by an incident airflow, generating a lift, wherein the profiled contour is divided into a root region (8) having a substantially circular or elliptical profile closest to the hub (3).

Moreover FIG. 2 shows that the blade comprises an airfoil region (9) having a lift-generating profile furthest away from the hub, and a transition region (10) between the root region (8) and the airfoil region (9), the transition region (10) having a profile gradually changing in the radial direction from a circular or elliptical profile at the root region (8) to the lift-generating profile of the airfoil region (9).

Said blade further comprises a shoulder (11) having a shoulder width (W) located at a distance (L1) from the blade root end (5), wherein the airfoil region (9) extends from a distance that is less than the distance (L1) from the blade root end (5) and consequently the shoulder (11) is located in the airfoil region (9).

In the preferred embodiment described above, the ratio between the shoulder width and the blade length is approximately 0.054 and the relative thickness in a blade length interval of 0-0.8 L is at least approximately 26%.

Moreover, in the preferred embodiment illustrated, the root region has a root diameter (D) and the ratio between the shoulder chord length (W) and the root diameter (D) is 1.35 or less.

In particular, in the preferred embodiment illustrated, the root region has a root diameter (D) at the root end of the blade, wherein the ratio between the shoulder chord length and the root diameter (D) is approximately 1.25.

The shoulder is located in the preferred embodiment being described at a distance of 0.21 L from the blade root.

FIG. 2, also shows that in a preferred embodiment the blade comprises a first airfoil profile (12) at the beginning airfoil region (9) having a relative thickness of between 38% and 42%, and wherein the distance from the shoulder (11) to the beginning of the airfoil region (9) is at least 0.02 L.

Likewise, the wind turbine blade further comprises a second airfoil profile (13), located closer to the root end than the shoulder (11).

The relative thickness of the second profile (13) is between 34% and 36%.

In the preferred embodiment described, the distance from the second airfoil profile (13) to the shoulder (11) is at least 0.0035 L.

Figure 3:
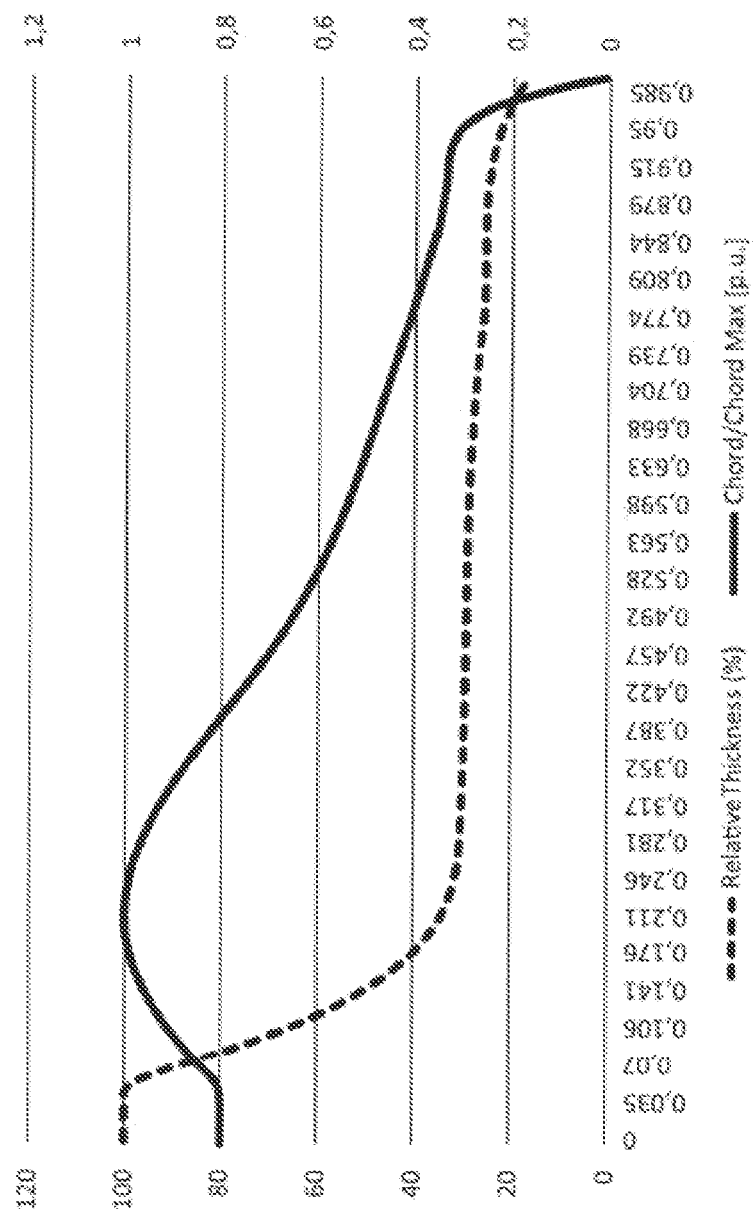
FIG. 3.—Shows a representation of the relative thickness and the chord in per unit values along the blade span according to a preferred embodiment of the invention.

FIG. 3 shows a representation of the relative thickness and the chord length values along the blade span according to a preferred embodiment of the invention.

Example

In the following an example of a wind turbine blade according to the invention is given. The distribution of chord length and relative thickness t/c is listed in Table 1:

TABLE 1

| L (p.u) | Relative Thickness (%), | Chord/Chord Max [p.u.] |
|---|---|---|
| 0 | 100 | 0.801871989 |
| 0.05 | 99.636656 | 0.803387054 |
| 0.101 | 70.50665 | 0.900217913 |
| 0.151 | 48.111202 | 0.969237958 |
| 0.176 | 41.081248 | 0.988776922 |
| 0.186 | 38.909765 | 0.993869598 |
| 0.206 | 35.512289 | 0.999920613 |
| 0.216 | 34.23084 | 1 |
| 0.251 | 31.463423 | 0.990220947 |
| 0.302 | 30.27841 | 0.94689499 |
| 0.352 | 29.85044 | 0.878354127 |
| 0.402 | 29.588743 | 0.796681512 |
| 0.452 | 29.42458 | 0.713934873 |
| 0.503 | 29.289209 | 0.641854127 |
| 0.553 | 29.11389 | 0.584598114 |
| 0.573 | 29.017179 | 0.565065191 |
| 0.608 | 28.792857 | 0.534457944 |
| 0.653 | 28.368444 | 0.499908543 |
| 0.704 | 27.660836 | 0.464626297 |
| 0.754 | 26.638316 | 0.42881991 |
| 0.804 | 25.647794 | 0.392434574 |
| 0.854 | 25.581988 | 0.361047509 |
| 0.889 | 25.349216 | 0.34369432 |
| 0.905 | 25.066948 | 0.338378552 |
| 0.95 | 23.099917 | 0.315121522 |
| 0.97 | 21.498504 | 0.253961787 |
| 0.98 | 20.489355 | 0.197260672 |
| 0.995 | 18.684607 | 0.068597261 |
| 1 | 18 | 0.012131195 |

The invention claimed is:

1. A blade for a rotor of a wind turbine having a horizontal rotor shaft, the rotor comprising a hub, from which the blade having a longitudinal distance extends in a radial direction when mounted to the hub, the blade having a longitudinal direction with a tip end and a root end and a transverse direction, wherein the blade comprises:
   a profiled contour including a pressure side and a suction side, as well as a leading edge and a trailing edge with a chord having a chord length extending between the leading edge and the trailing edge, the profiled contour configured to generate a lift when being impacted by an incident airflow, wherein the profiled contour is divided into:
   a root region having a circular or elliptical profile closest to the hub,
   an airfoil region having a lift-generating profile furthest away from the hub, and
   a transition region between the root region and the airfoil region, the transition region having a profile gradually changing in the radial direction from the circular or elliptical profile at the root region to the lift-generating profile of the airfoil region,
   a shoulder having a shoulder width located at a first distance from the blade root end, wherein the airfoil region extends from a second distance from the blade root end, wherein the second distance is smaller than the first distance so that the shoulder is located within the airfoil region and the airfoil region comprises a first airfoil profile being a lift-generating profile.

2. The blade of claim 1, wherein the difference between the first distance and the second distance is greater than 2% of the longitudinal distance of the blade.

3. The blade of claim 2, wherein the second distance is less than 20% of the longitudinal distance of the blade.

4. The blade of claim 3, wherein the first distance is more than 18% and less than 25% of the longitudinal distance of the blade.

5. The blade of claim 1, wherein the first airfoil profile is located at the second distance having a relative thickness of between 36% and 44%.

6. The blade of claim 5 further comprising a second airfoil profile located at a third distance from the blade root end smaller than the first distance.

7. The blade of claim 6, wherein the second airfoil profile comprises a relative thickness between 34% and 36%.

8. The blade of claim 6, wherein the difference between the first distance and the third distance is greater than 0.35% of the longitudinal distance of the blade.

9. The blade of claim 1, wherein the relative thickness in a blade length interval of 0-80% of the longitudinal distance of the blade is at least 26%.

10. The blade of claim 9, wherein a relative thickness in a blade length interval 0-65% of the longitudinal distance of the blade is at least 28%.

11. The blade of claim 1, wherein a relative thickness in a blade length interval of 80-95% of the longitudinal distance of the blade is at least 20%.

12. The blade of claim 11, wherein a relative thickness in a blade length interval of 80-98% of the longitudinal distance of the blade is at least 20%.

13. The blade of claim 11, wherein a relative thickness in a blade length interval 80-90% of the longitudinal distance of the blade is at least 25%.

14. The blade of claim 1, comprising one or more lift-generating profiles along a blade length interval of 95-97.5% of the longitudinal distance of the blade wherein the chord length of the one or more lift-generating profiles is greater than 20% of the chord length at the shoulder.

15. The blade of claim 7 further comprising a third airfoil profile having a relative thickness of between 29% and 31% located closer to the tip than the shoulder.

16. The blade of claim 15 further comprising a fourth airfoil profile having a relative thickness of between 24% and 26%, located at a blade span position between 75-90% of the longitudinal distance of the blade.

17. The blade of claim 16 further comprising a fifth airfoil profile having a relative thickness of between 20.6% and 21.4% located at a blade span position between 94-98% of the longitudinal distance of the blade.

18. The blade of claim 17 further comprising a sixth airfoil profile having a relative thickness of between 17.7% and 18.3% located at a blade span position between 96-100% of the longitudinal distance of the blade.

19. The blade of claim 1, wherein the first airfoil profile is chosen from a set of airfoil profiles.

* * * * *